United States Patent Office 3,419,121
Patented Dec. 31, 1968

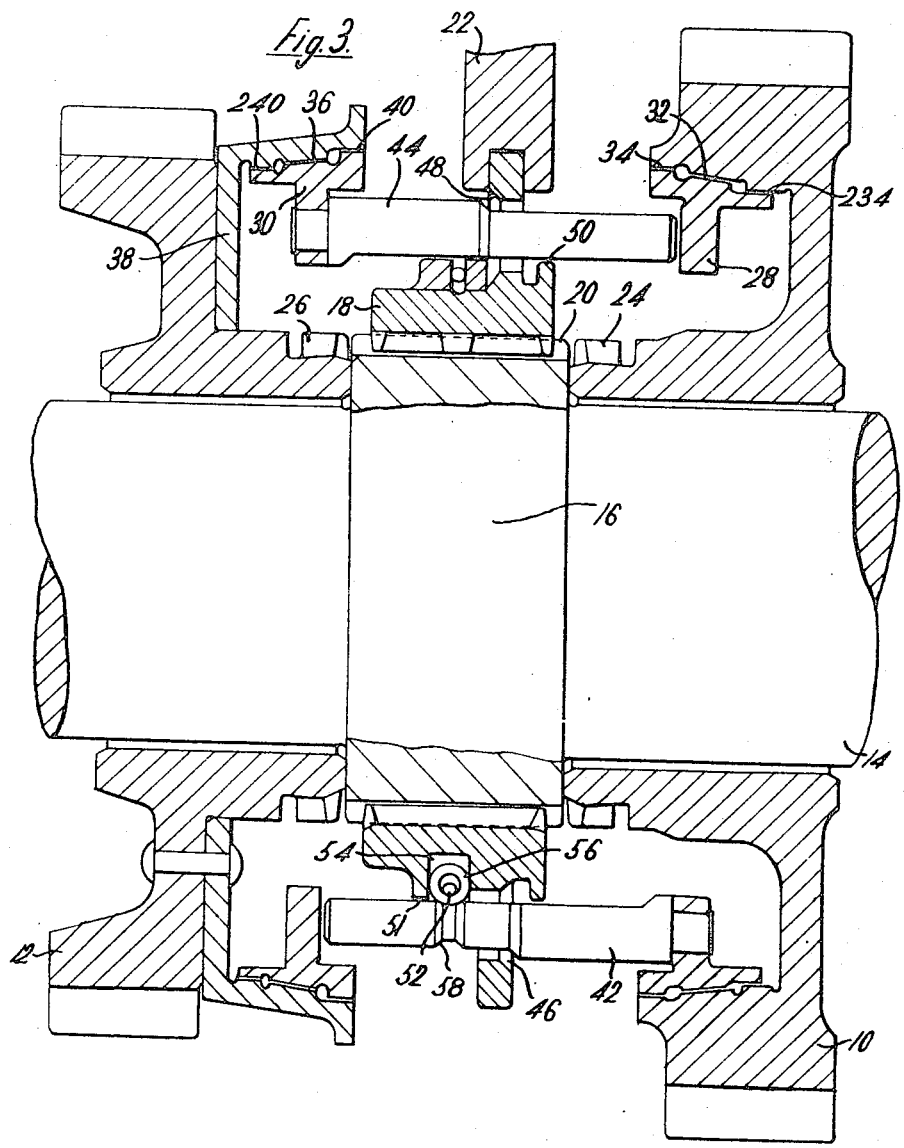

3,419,121
POSITIVE-CLUTCH COUPLING ARRANGEMENTS HAVING SYNCHRONIZER MECHANISMS AND CYLINDRICAL BEARING MEANS
Thomas Charles Felix Stott, Harpenden, England, assignor to General Motors Corporation, Detroit, Mich., a corporation of Delaware
Filed Dec. 28, 1966, Ser. No. 605,331
Claims priority, application Great Britain, Jan. 6, 1966, 591/66
9 Claims. (Cl. 192—53)

ABSTRACT OF THE DISCLOSURE

Separate synchronizer rings of a double-acting positive-clutch coupling arrangement for a change-speed transmission mechanism each have a cylindrical bearing surface immediately adjacent one or other, or both, axial ends of their frusto-conical synchronizer surface; each cylindrical surface co-operates with a corresponding cylindrical surface on another member, to control the radial position of the respective synchronizer ring.

Background of the invention (1) *Field of the invention.*—Synchronizing devices for change-speed transmission mechanisms.

(2) *Description of the prior art.*—United States specification 1,909,644 (Westcott) discloses cylindrical bearing surfaces spaced from respective frusto-conical synchronizer surfaces of a pair of synchronizer rings of a double-acting positive-clutch coupling arrangement: the cylindrical surfaces are used as control surfaces to center the synchronizer rings and yet permit them to move axially.

Summary of the invention

Location of the cylindrical bearing surfaces of the separate synchronider rings immediately adjacent one or other, or both, axial ends of the frusto-conical synchronizer surfaces of the synchronizer rings gives improved control of the radial position and axial alignment of the rings even when their frusto-conical synchronizer surfaces are running free. This reduces the likelihood of the rings tilting and possibly jamming during the next synchronizing operation, even when the synchronizer rings have a short axial length relatively to their diameter, as may be the case in heavy-duty gearboxes.

Brief description of the views of the drawings

FIGS. 1 to 3 of the drawings are partial axial sections showing three embodiments of positive-clutch coupling arrangements according to the present invention, forming part of respective change-speed transmissions.

Figure 1:
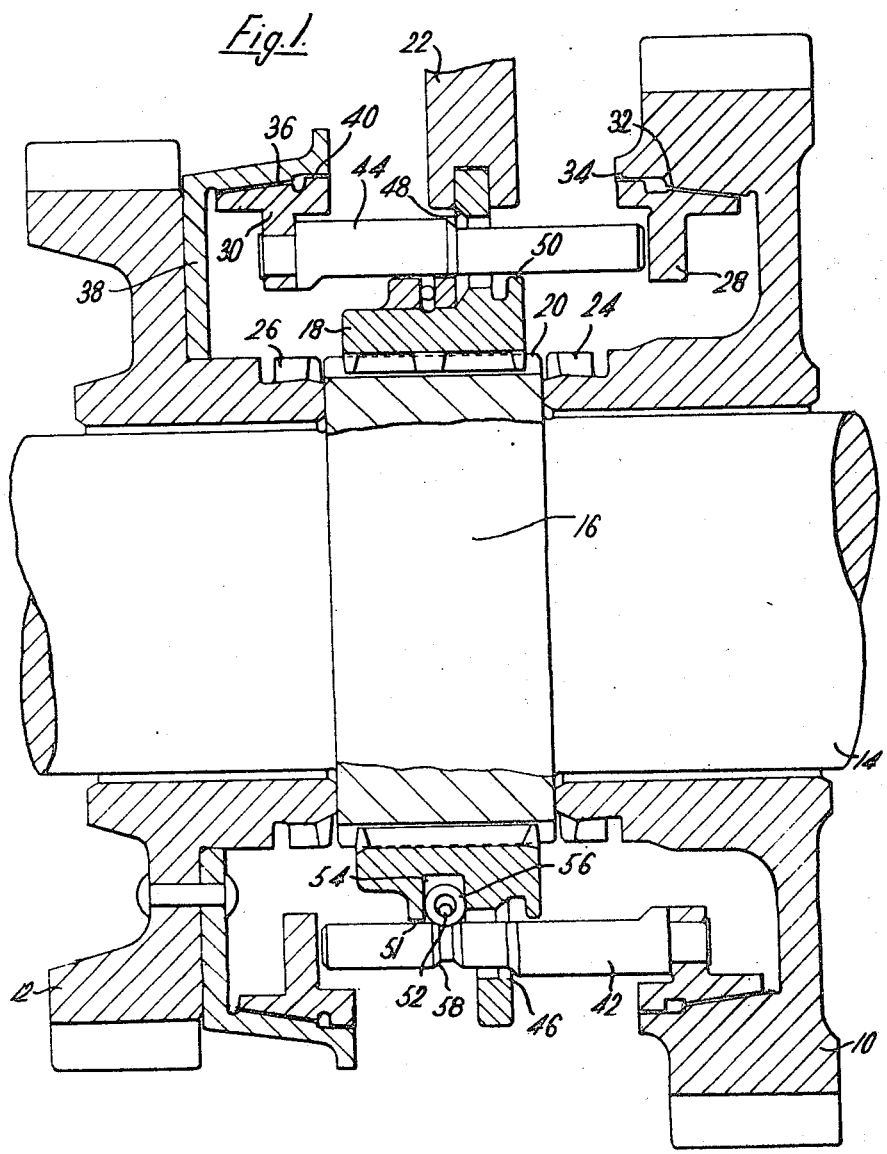

In the embodiment shown in FIGURE 1, a positive-clutch coupling arrangement comprises second- and third-ratio gearwheels 10 and 12 which are journalled on a mainshaft 14 of a five forward-speed and reverse constant-mesh gearbox for a motor vehicle, at opposite axial ends of a cylindrical boss portion 16 of the mainshaft. A clutch coupling sleeve 18 is slidably mounted on the boss portion by means of longitudinal internal splines which engage longitudinal external splines 20 on the boss portion.

By means of a striker fork 22, the clutch coupling sleeve 18 can be slid axially, from the neutral position shown, to the right or left to bring the internal splines of the clutch coupling sleeve into positive engagement with respective external dog teeth 24 and 26 on the gearwheels 10 and 12. In this manner the clutch coupling sleeve, and accordingly the mainshaft 14, can be brought into positive engagement with a selected one of the gearwheels, the gearwheels being driven at different speeds by respective gearwheels (not shown) of a layshaft (also not shown) of the constant-mesh gearbox.

The positive-clutch coupling arrangement also includes separate synchronizer rings 28 and 30 for the respective gearwheels 10 and 12. The synchronizer ring 28 has an external frusto-conical surface 32 for frictional engagement with a corresponding internal frusto-conical surface formed in a recessed portion of the gearwheel 10, and, immediately adjacent the larger-diameter axial end of the frusto-conical surface 32, an external cylindrical bearing surface 34 positioned to co-operate with a corresponding internal cylindrical bearing surface on the gearwheel 10 in this neutral position. Similarly, the synchronizer ring 30 has an external frusto-conical surface 36 for frictional engagement with a corresponding internal frusto-conical surface on an extension 38 of the gearwheel 12, and, immediately adjacent the larger-diameter axial end of the frusto-conical surface 36, an external cylindrical bearing surface 40 positioned to co-operate with a corresponding internal cylindrical bearing surface on the extension 38 of the gearwheel 12. The cylindrical bearing surfaces on the gearwheels are co-axial with the longitudinal axis of the gearbox mainshaft 14 and cooperate in all positions from the neutral position FIG. 1 to the engaged position.

First and second sets of frusto-conically-shouldered balk pins 42 and 44 project from the respective synchronizer rings 28 and 30 into respective sets of chamfered apertures 46 and 48 in the clutch coupling sleeve 18. Each set of balk pins comprises three balk pins spaced 120° apart around the respective synchronizer ring, and the apertures for the two sets of balk pins are spaced alternately and symmetrically around the clutch coupling sleeve. The balk pins co-operate with external cylindrical guide surfaces 50 and 51 formed on the clutch coupling sleeve.

A circular detent spring 52 is disposed in an external annular groove 54 in the clutch coupling sleeve. Three apertured spherically-surfaced members 56 are mounted on the spring in the manner of beads on a string, and are biased by the spring in a radially outward direction into a circumferential detent groove 58 in the less-diameter portion of respective ones of the set of balk pins 42 for the synchroniser ring 28 of the right-hand (second-ratio) gearwheel 10.

Figure 2:
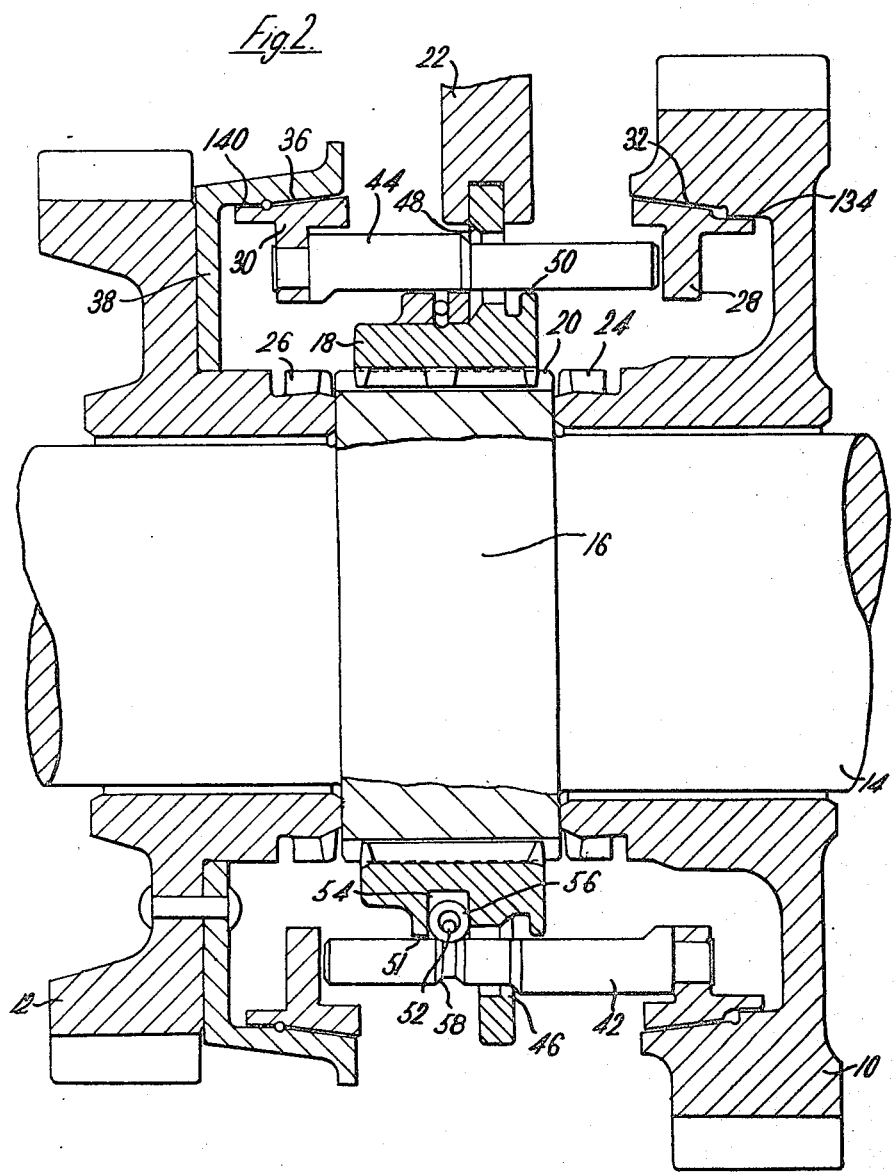

In the embodiment of the positive-clutch coupling arrangement according to the invention shown in FIGURE 2, the external cylindrical bearing surfaces 34 and 40 immediately adjacent the larger-diameter axial ends of the respective frusto-conical surfaces 32 and 36 are replaced by external cylindrical bearing surfaces 134 and 140 immediately adjacent the smaller-diameter axial ends of the respective frusto-conical surfaces 32 and 36. In the embodiment shown in FIGURE 3, the external cylindrical bearing surfaces 34 and 40 immediately adjacent the larger-diameter axial ends of the respective frusto-conical surfaces 32 and 36 are complemented by additional external cylindrical bearing surfaces 234 and 240 immediately adjacent the smaller-diameter axial ends of the respective frusto-conical surfaces. Apart from these differences, the embodiments shown in FIGURES 2 and 3 are identical with the embodiment shown in FIGURE 1, and like parts are denoted by like reference numerals.

The three embodiments of the positive-clutch coupling arrangement according to the invention operate as follows:

If a gearshift is to be made from third gear ratio-initially the clutch coupling sleeve 18 has its internal splines in engagement with the external dog teeth 26 of the third ratio gearwheel 12, and is thus to the left of the neutral position shown in each of the drawings. Under these conditions the clutch couplings sleeve 18 forms a positive-clutch connection by means of which the gearbox mainshaft 14 is driven at the same speed of rotation as the third ratio gearwheel.

For a downshift from third to second ratio, the shift fork 22 is moved to the right to move the clutch coupling sleeve 18 axially towards the second ratio gearwheel 10, thereby initially disengaging the internal splines of the clutch coupling sleeve from the external dog teeth 26 of the third ratio gearwheel, and establishing the neutral position of the clutch coupling sleeve which is shown in the drawings, namely the condition in which the gearbox mainshaft is disconnected from both the third and second ratio gearwheels, and so no longer receives drive from the gearbox layshaft.

With the clutch coupling sleeve in the neutral position, the spherically-surfaced members 56 can, under the influence of the bias of the circular detent spring 52, snap into the circumferential detent groove 58 in the lesser-diameter portion of the second-ratio set of balk pins 42, as shown in the drawings.

The resilient bias acting on the spherically-surfaced members acts in a circumferential direction on the balk pins to cause throw-over of the balk pins in a circumferential direction, the direction of throw-over depending on the relative speed of rotation of the clutch coupling sleeve and the second-ratio synchronizer ring 28. The second-ratio balk pins 42 are thereby biased in a circumferential direction, the direction of throw-over depending on the relative spee dof rotation of the clutch coupling sleeve and the second-ratio synchronizer ring 28. The second-ratio balk pins 42 are thereby biased in a circumferential direction into engagement with the walls of the apertures 46 in the clutch coupling sleeve 18.

The spherically-surfaced members 56 also form a resiliently yieldable "energizing" connection between the clutch coupling sleeve and the second-ratio balk pins. Consequently, continued axial movement of the clutch coupling sleeve towards the second-ratio gearwheel 10 causes axial entrainment of the balk pins 42 and accordingly also of the second-ratio synchronizer ring 28. The frusto-conical surface 32 on the second-ratio synchronizer ring is thereby brought into frictional engagement with the corresponding internal frusto-conical surface formed in the recessed portion of the second-ratio gearwheel, to begin to bring the speed of rotation of the second-ratio gearwheel into synchronism with that of the clutch coupling sleeve.

The approach towards synchronism continues until the axial force still being imparted to the clutch coupling sleeve by the striker fork 22 overcomes the resilient bias of the detent spring 52 and allows the spherically-surfaced members 56 to snap out of the respective circumferential grooves in the balk pins 42. The clutch coupling sleeve can thereby move to the right relatively to the balk pins 42, until the chamfered surfaces of the apertures 46 in the clutch coupling sleeve engage the frusto-conical shoulders on the balk pins 42. When this position is reached, no further movement of the clutch coupling sleeve relatively to the balk pins 42 is possible, because the balk pins 42 remain out of alignment in the apertures 46 of the clutch coupling sleeve under the action of the resilient throw-over imparted by the detent spring 52, and under the action of the rotational lag resulting from the different speeds of rotation of the clutch coupling sleeve and the second-ratio gearwheel.

Finally, the frictional engagement of the frusto-conical surface 32 of the synchronizer ring 28 with the corresponding frusto-conical surface of the second-ratio gearwheel causes the rotary speed of the second-ratio gearwheel to attain or closely approach synchronism with the clutch coupling sleeve, whereupon the axial force still being applied to the clutch coupling sleeve is sufficient to cause the chamfered surfaces of the apertures 46 to ride over the frusto-conical shoulders of the balk pins 42, thereby bringing the apertures into circumferential alignment with the respective balk pins, and allowing the clutch coupling sleeve to move axially to the ring relatively to the balk pins and to the second-ratio synchronizer ring to bring the internal splines of the clutch coupling sleeve into engagement with the external dog teeth of the second-ratio gearwheel 10, so establishing a positive connection by means of which the clutch coupling sleeve and gearbox mainshaft 14 are driven at the rotary speed of the second-ratio gearwheel.

The action during an upshift from second to third ratio is similar, except that the spherically-surfaced members 56 do not act directly on the third-ratio balk pins 44, energization being effected by abutment of the free ends of the second-ratio balk pins 42 with the third-ratio synchronizer ring 30.

The cylindrical bearing surfaces 34 and 40 of the second- and third-ratio synchronizer rings 28 and 30 control the radial positions of the synchronizer rings, and thus maintain the synchronizer rings in axial alignment with the longitudinal axis of the gearbox mainshaft 16, even when the frusto-conical surface of either synchronizer ring is not in frictional engagement with the internal frusto-conical surface of the respective gearwheel. This is especially desirable for synchronizer rings which have a short axial length relatively to their diameter, as may be used in heavy-duty gearboxes. If the cylindrical bearing surfaces were not present, in the disengaged condition of a synchronizer ring the synchronizer ring could move slightly away from the associated gearwheel, so producing a radial clearance between the frusto-conical surfaces of the synchronizer ring and of the gearwheel, whereby rotational forces could cause the synchronizer ring to move radially out of alignment with the gearwheel, and thus be likely to tilt and possibly jam when next engaged.

The external cylindrical guide surfaces 50 assist in controlling the position of the synchronizer rings, since the balk pins co-operate with these guide surfaces to inhibit tilting movement of the synchronizer rings.

I claim:

1. A synchronized positive-clutch coupling arrangement for a change-speed transmission mechanism, comprising a rotary shaft, a clutch coupling sleeve driven by the shaft and slidably mounted on the shaft, a rotary drive member having a frusto-conical and cylindrical bearing surface means radially and axially immediately adjacent one end said frusto-conical surface, positive drive means on said clutch coupling sleeve and said rotary drive member interengageable to produce selective posivtive drive between the clutch coupling sleeve and the rotary drive member on sliding movement of said clutch coupling sleeve from a neutral position to an engaged position, a synchronizer ring having a frusto-conical surface frictionally engageable in the engaged position with the frusto-conical surface on the rotary drive member, synchronizer ring engagement means on said synchronizer ring and clutch coupling sleeve for rotating said synchronizer ring with said clutch coupling sleeve and axially moving said synchronizer ring from a disengaged position to an engaged position engaging said frusto-conical surfaces and permitting movement of said synchronizer out of axial alignment on axial movement of said clutch coupling sleeve from said neutral position toward said engaged position, and said synchronizer ring having radially and axially immediately adjacent the like axial end of said frusto-conical surface cylindrical bearing surface means positioned in all positions of relative movement for bearing cooperation with said cylindrical bearing surface on the rotary drive member for maintaining concentricity in all positions during movement from the disengaged to the engaged position of said synchronizer ring to coaxially locate said frusto-conical surfaces of the synchronizer ring and rotary drive member.

2. The invention defined in claim 1 and said synchronizer ring engagement means being coaxially supported permitting said movement out of alignment on said clutch coupling sleeve at a point axially spaced from said frusto-conical surface and bearing surface means of said synchronizer ring.

3. The invention defined in claim 1 and said drive member having said cylindrical bearing surface means immediately at one end of said frusto-conical surface and said synchronizer ring having said cylindrical bearing surface means immediately at the like end of said frusto-conical surface in bearing cooperation with said cylindrical bearing surfaces on said drive member.

4. A positive-clutch coupling arrangement according to claim 1, wherein the cylindrical bearing surface means of said synchronizer ring and drive member are formed immediately adjacent a larger-diameter axial end of the frusto-conical surface of the respective synchronizer ring and drive member.

5. A positive-clutch coupling arrangement according to claim 1, wherein the cylindrical bearing surface means of said synchronizer ring and drive member are formed immediately adjacent the smaller diameter axial end of the frusto-conical surfaces of the respective synchronizer ring and drive member.

6. A positive-clutch coupling arrangement according to claim 1, wherein a pair of the cylindrical bearing surface means are formed on said synchronizer ring one bearing surface means being located immediately adjacent each axial end of the frusto-conical surface of said synchronizer ring, said drive member having a pair of cylindrical bearing surface means, one bearing surface means being located immediately adjacent each end of said frusto-conical surface of said drive member and each cylindrical bearing surface means on said synchronizer ring cooperates with a corresponding cylindrical bearing surface formed on the respective drive member for bearing support in all positions of synchronizer movement.

7. A positive-clutch coupling arrangement according to claim 1, and said synchronizer ring engagement means including a resiliently yieldable connection between the clutch coupling sleeve and at least one of the synchronizer rings.

8. A positive-clutch coupling arrangement according to claim 2, and said synchronizer ring engagement means includes chamfered apertures in the clutch coupling sleeve and shouldered balk pins projecting axially from the synchronizer ring into said chamfered apertures in the clutch coupling sleeve.

9. A positive-clutch coupling arrangement according to claim 8, wherein guide surfaces formed on the clutch coupling sleeve cooperate with the balk pins for controlling tilting movement of the synchronizer rings.

References Cited

UNITED STATES PATENTS

| | | | |
|---|---|---|---|
| 2,271,571 | 2/1942 | Peterson | 192—53.5 |
| 2,369,842 | 2/2945 | Neracher et al. | 192—53.6 |
| 2,546,746 | 3/1951 | Henning | 192—53.7 |

FOREIGN PATENTS 191,045  12/1907  Germany.

BENJAMIN W. WYCHE III, *Primary Examiner.*

LESLIE J. PAYNE, *Assistant Examiner.*

U.S. Cl. X.R.

192—66, 110

UNITED STATES PATENT OFFICE
CERTIFICATE OF CORRECTION

Patent No. 3,419,121

December 31, 1968

Thomas Charles Felix Stott

It is certified that error appears in the above identified patent and that said Letters Patent are hereby corrected as shown below:

Column 1, line 40, "synchronider" should read -- synchronizer --. Column 3, line 29, beginning with "The second-ratio balk pins 42" cancel all to and including "ring 28." in line 33, same column 3. Column 4, line 5, "ring" should read -- right --.

Signed and sealed this 17th day of March 1970.

(SEAL)
Attest:

Edward M. Fletcher, Jr.
Attesting Officer

WILLIAM E. SCHUYLER, JR.
Commissioner of Patents